UNITED STATES PATENT OFFICE.

ERNST A. RUPPELT, OF FITCHBURG, MASSACHUSETTS, ASSIGNOR OF ONE-TENTH TO MAX B. SCHAFF, OF FITCHBURG, MASSACHUSETTS.

COMPOSITION FOR MAKING TOYS AND OTHER ARTICLES.

1,275,092.  Specification of Letters Patent.  Patented Aug. 6, 1918.

No Drawing.  Application filed March 26, 1918. Serial No. 224,835.

*To all whom it may concern:*

Be it known that I, ERNST A. RUPPELT, a citizen of the United States, residing at Fitchburg, in the county of Worcester and State of Massachusetts, have invented certain new and useful Improvements in Compositions for Making Toys and other Articles; and I do hereby declare the following to be a full, clear, and exact description of the invention, such as will enable others skilled in the art to which it appertains to make and use the same.

My invention has for its object the production of a composition of matter from which figure and other toys and other articles may be made by the cold process.

A further object of the invention is the production of a composition of matter which may be made at a small cost and from which figure and other toys and other articles of a light and indestructible nature may be made.

My composition consists of a mixture of glue, paper pulp and slate dust. In preparing the composition, I prefer to use the ingredients in about the following proportions—viz., twenty per cent. of glue, four per cent. of paper pulp and seventy-six per cent. of slate dust. These ingredients when mixed form a mortar of such consistency that it may be readily molded by the cold process to provide hollow figure and other toys and other articles.

My composition is light, it may be readily molded into any configuration, it does not crack on drying, and it will retain a coating of paint or other material so effectively as to prevent the coating from peeling.

Having thus fully described my composition, what I claim as new and desire to secure by Letters Patent, is:

1. A composition for making toys and other articles, consisting of glue, paper pulp and slate dust, in or about the proportions stated.

2. A composition for making toys and other articles, consisting of glue twenty per cent., paper pulp four per cent., and slate dust seventy-six per cent.

In testimony whereof I affix my signature in presence of two witnesses.

ERNST A. RUPPELT.

Witnesses:
 MAX B. SCHAFF,
 EDWIN A. ADLER.